United States Patent [19]

Williams

[11] Patent Number: 5,485,717
[45] Date of Patent: Jan. 23, 1996

[54] MULTI-SPOOL BY-PASS TURBOFAN ENGINE

[75] Inventor: Gregg G. Williams, Milford, Mich.

[73] Assignee: Williams International Corporation, Walled Lake, Mich.

[21] Appl. No.: 267,616

[22] Filed: Jun. 29, 1994

[51] Int. Cl.⁶ ........................................... F02K 3/02
[52] U.S. Cl. ................. 60/39.03; 60/226.1; 60/39.161
[58] Field of Search ............................... 60/226.1, 226.3, 60/39.183, 39.181, 226.2, 39.03

[56] References Cited

U.S. PATENT DOCUMENTS

| 2,602,292 | 7/1952 | Buckland et al. | |
| 2,929,206 | 3/1960 | Davenport . | |
| 2,943,815 | 7/1960 | Besson . | |
| 3,363,415 | 1/1968 | Williams | 60/39.51 |
| 3,937,013 | 2/1976 | Aspinwall | 60/226.3 |
| 4,005,575 | 2/1977 | Scott et al. | 60/226.1 |
| 4,435,958 | 3/1984 | Klees | 60/226.1 |

*Primary Examiner*—Timothy S. Thorpe
*Attorney, Agent, or Firm*—Lyman R. Lyon

[57] ABSTRACT

A multi-spool turbofan engine has a high pressure spool that operates at high idle RPM so as to power accessories and minimize acceleration time from idle to full rated RPM without producing high idle thrust which compromises the landing maneuver and ground operation.

2 Claims, 4 Drawing Sheets

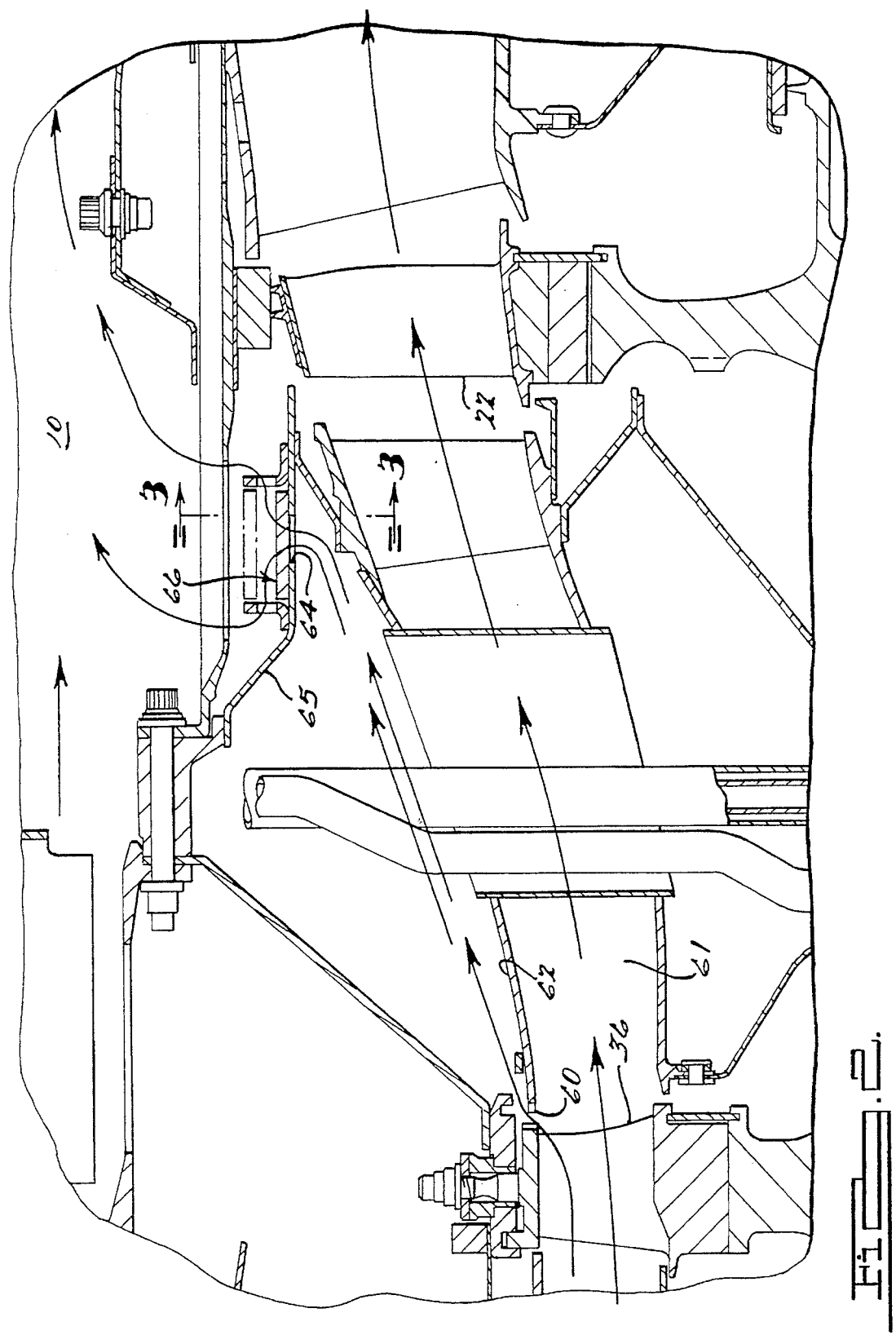

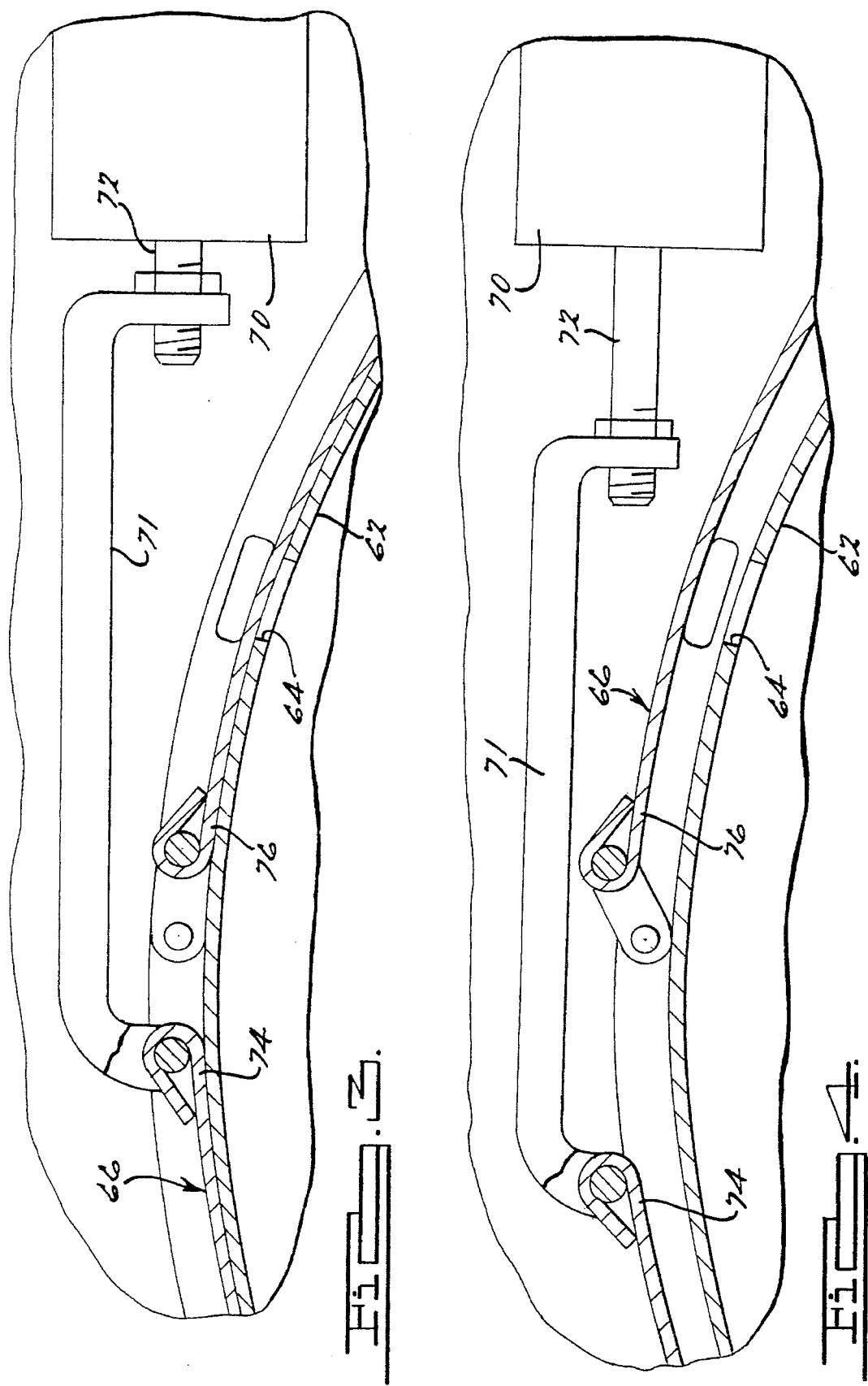

MULTI-SPOOL BY-PASS TURBOFAN ENGINE

BACKGROUND OF THE INVENTION

This invention relates generally to gas turbine engines and more particularly to a multi-spool by-pass turbofan engine having specific utility as the power plant of a jet aircraft.

Multi-spool by-pass turbofan engines have been accepted by the aircraft industry as efficient and dependable power plants. A typical engine comprises a low pressure spool having a fan at a forward end and a low pressure turbine at the aft end thereof. A high pressure spool has a high pressure compressor in fluid flow communication with the fan on the low pressure spool and a high pressure turbine in fluid flow communication with the low pressure turbine on said low pressure spool. In certain applications, an intermediate pressure compressor is orientated downstream of the fan, either as part of an intermediate pressure spool or as a component of the low pressure spool. If mounted on a separate intermediate pressure spool, the intermediate pressure compressor is coupled to an intermediate pressure turbine.

The fan on the low pressure spool is generally aligned with an annular by-pass duct that surrounds the high and low pressure spools.

A combustor is located between the high pressure compressor and high pressure turbine of the engine. Engine accessories including a generator and hydraulic pump are driven by the high pressure spool. The aforesaid geometry is relatively efficient and is well proven in field use.

One requirement of an aircraft jet engine is that the time required to accelerate the high pressure spool of the engine from idle RPM to full rated RPM be minimized so as to minimize the time necessary to achieve full rated thrust for airspeed recovery in the event of a stall or aborted landing approach. The engine acceleration time frame is generally minimized by utilizing a relatively high idle RPM for the high pressure spool of the engine.

Another factor to be considered is that an aircraft requires substantially more electrical power on the ramp than is available from the aircraft's battery. On large aircraft, electrical power is generally supplied by an onboard auxiliary power unit. On smaller aircraft, such as business or commuter aircraft, the cost, weight, and cube exhibited by an onboard auxiliary power unit are prohibitive. Accordingly, electrical power, hydraulic power and air cycle air conditioning are often supplied by the aircraft's engines. In order to produce the necessary power, the high pressure spool of the engine must exhibit a relatively high idle RPM.

An anomaly exists, however, in satisfying the aforesaid requirements because the high idle RPM of the high pressure spool necessary to minimize the engine acceleration time frame from idle to full RPM and to supply adequate power on the ramp characteristically increases idle thrust to an unsatisfactory level. High idle thrust compromises both the landing maneuver and ground operation of the aircraft.

SUMMARY OF THE INVENTION

The inventive concept behind applicant's solution to the aforesaid problem is founded on the recognition that over seventy-five percent of the thrust exhibited by a by-pass turbofan engine at idle RPM is due to air mass flow induced by the fan. Applicant has discovered that excessively high thrust at idle RPM can be eliminated while maintaining a desired relatively high idle RPM of the high pressure spool by concomitantly a) reducing the compression ratio of the fan and intermediate pressure compressor, if used, b) increasing the expansion ratio across the high pressure turbine, and c) reducing the expansion ratio across the low pressure turbine. The aforesaid expedients have the net effect of reducing fan speed and therefore the air mass flow through the fan thereby reducing idle thrust to an acceptable level even though the high pressure spool operates at relatively high RPM due to the increased expansion ratio thereacross. Further, the reduced pressure ratio of the fan and intermediate pressure compressor, if used, reduces the pressure and density of the air entering the high pressure compressor thereby reducing the core air flow and the thrust produced by the core air.

The aforesaid concept is implemented by ducting a portion of the combustion gases from a point immediately aft of the high pressure turbine into the by-pass duct of the engine when the engine is in the idle condition.

While venting of interstage pressure in a gas turbine engine is disclosed in Williams U.S. Pat. No. 3,363,415, assigned to the assignee of the present invention, said patent is silent as to the problem of minimizing idle thrust of a fan jet engine while maintaining high idle RPM thereby minimizing the time frame of engine acceleration from idle to full RPM and maximizing power available to drive accessories at engine idle.

Stated in another manner, Williams U.S. Pat. No. 3,363,416 does not address the problem solved by the present invention because the engine disclosed in said patent did not utilize a fan upstream of the high pressure compressor. It should be noted, however, that the present invention not only reduces idle thrust while maintaining idle speed, but is significantly more effective in reducing fuel consumption than the Williams U.S. Pat. No. 3,363,416 engine. This comes about because the engine of the present invention exhibits a reduction in the air mass flow to and through the high pressure compressor and hence through the burner. The reduction in air mass flow reduces the amount of fuel necessary to attain a given temperature at the burner exit.

BRIEF DESCRIPTION OF THE DRAWINGS

FIG. 2 is a view taken within the area "2" of FIG. 1;

FIG. 3 is a cross-sectional view taken along the line 3—3 of FIG. 2;

FIG. 4 is a view similar to FIG. 3 showing the by-pass valve in the open condition.

DETAILED DESCRIPTION OF THE PREFERRED EMBODIMENT

Figure 1:
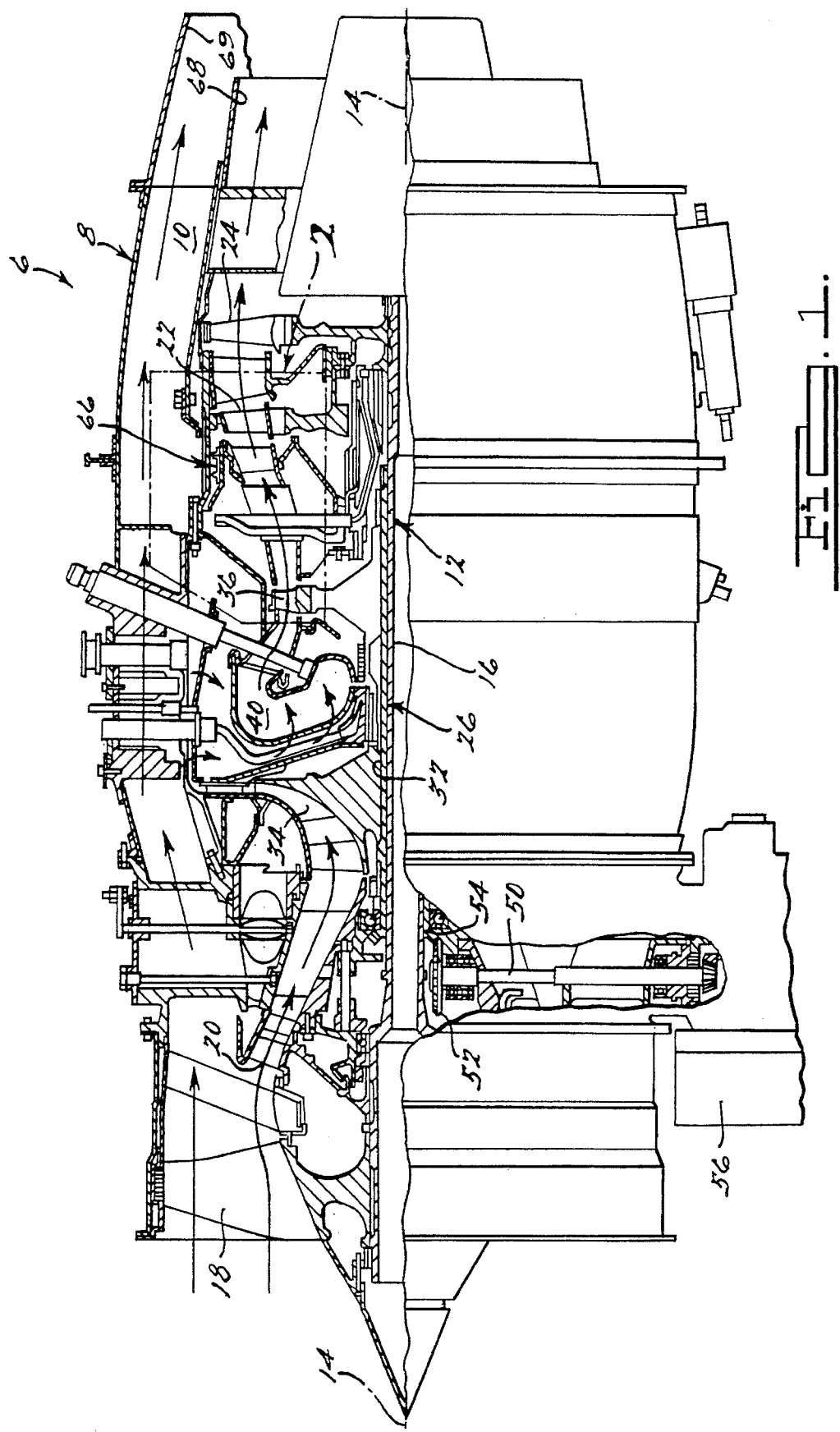
FIG. 1 is an elevational view, partially in cross section, of a multi-spool turbofan engine in accordance with the present invention.

As best seen in FIG. 1, a multi-spool by-pass turbofan engine 6 comprises a cylindrical housing 8 the outer extremity of which defines the outer wall of an annular by-pass duct 10. A low pressure spool assembly 12, is rotatable about a central longitudinal axis 14 of the engine 6 and comprises a shaft 16 having a fan 18 and an intermediate pressure compressor stage 20 at the forward end thereof and an intermediate pressure turbine 22 and a low pressure turbine 24 at the aft end thereof.

A high pressure spool assembly 26 is telescoped over the low pressure spool 12 in coaxial relation thereto and comprises a shaft 32 having a high pressure compressor 34 at a forward end thereof and a high pressure turbine 36 at the aft end thereof.

An annular combustor 40 is disposed about the low and high pressure spools 12 and 26, respectively, between the high pressure compressor 34 and high pressure turbine 36.

An accessory drive shaft 50 has a gear 52 thereon which meshes with a complementary gear 54 on the shaft 32 of the high pressure spool 26. Conventional accessories, for example, a starter-generator 56, are driven by the accessory drive shaft 50 at an RPM directly related to the RPM of the high pressure spool 26.

The flow of air induced by the fan 18 of the fan jet engine 6 is split between combustion air that flows to high pressure compressor 34 and by-pass air that flows to the by-pass duct 10. Combustion air flows from the exit of the high pressure compressor 34 to the combustor 40 wherein fuel is introduced and burned. Combustion gases pass through the high pressure turbine 36, thence through the intermediate and low pressure turbines 22 and 24, respectively.

By-pass air flows from the fan 18 through the by-pass duct 10 without additional energy being imparted thereto. However, because of the relatively high mass flow of air induced by the fan 18, significant thrust is produced by the fan at idle RPM which, in the landing approach and in ground operation, is undesirable.

As best seen in FIG. 2, and in accordance with the present invention, when the engine 6 is operated in the idle condition, the hot gas stream exiting the high pressure turbine 36, is split so that a portion thereof flows through an annular by-pass aperture 60 in the outer wall 62 of the turbine interstage duct 61, immediately aft of the high pressure turbine 36, thence through a plurality of apertures 64 in an annular flange 65 of the inner wall 62 of the duct 10, thence past a band valve 66 and outwardly into the by-pass duct 10. The other portion of the hot combustion gas exiting the high pressure turbine 36 passes through the intermediate and low pressure turbine blades 22 and 24, respectively, through a mixing nozzle 68. This turbine exhaust then mixes with the by-pass flow from duct 10 and exits through the propulsion nozzle 69.

As seen in FIGS. 3 and 4, the band valve 66 is controlled by an actuator 70 through a link 71. Advancement of a rod 72 on the actuator 70 increases the spacing of end portions 74 and 76 of the band valve 66 thereby increasing its diameter and opening the apertures 64 in the by-pass duct inner liner 62.

Because gas flow from the combustor 40 is split immediately aft of the high pressure turbine 36 only a portion thereof passes through the intermediate and low pressure turbine blades 22 and 24 on the low pressure spool 12 thereby reducing significantly the power developed by the low pressure spool 12. Accordingly, the RPM of the fan 18 is significantly reduced thereby reducing the thrust of the engine 6 at idle conditions. Moreover, the resultant reduction in inlet pressure to the high pressure compressor 34 results in a significant reduction in the air mass flow to the combustor 40 materially reducing idle fuel consumption. However, it is to be noted that relatively high idle RPM of the high pressure spool 26 is maintained due to the fact that even though the air mass flow to the combustor 40 is reduced, a relatively high expansion ratio across the high pressure turbine 36 is due to bleed off of combustion gas immediately aft of the high pressure turbine. The high expansion ratio across the high pressure turbine results in a relatively high idle RPM for the high pressure spool 26 which, in turn, results in adequate power being delivered through the accessory shaft 50 to the alternator 56 thereby satisfying power requirements of the aircraft on the ramp and minimizing acceleration time from idle to full RPM.

Figure 5:
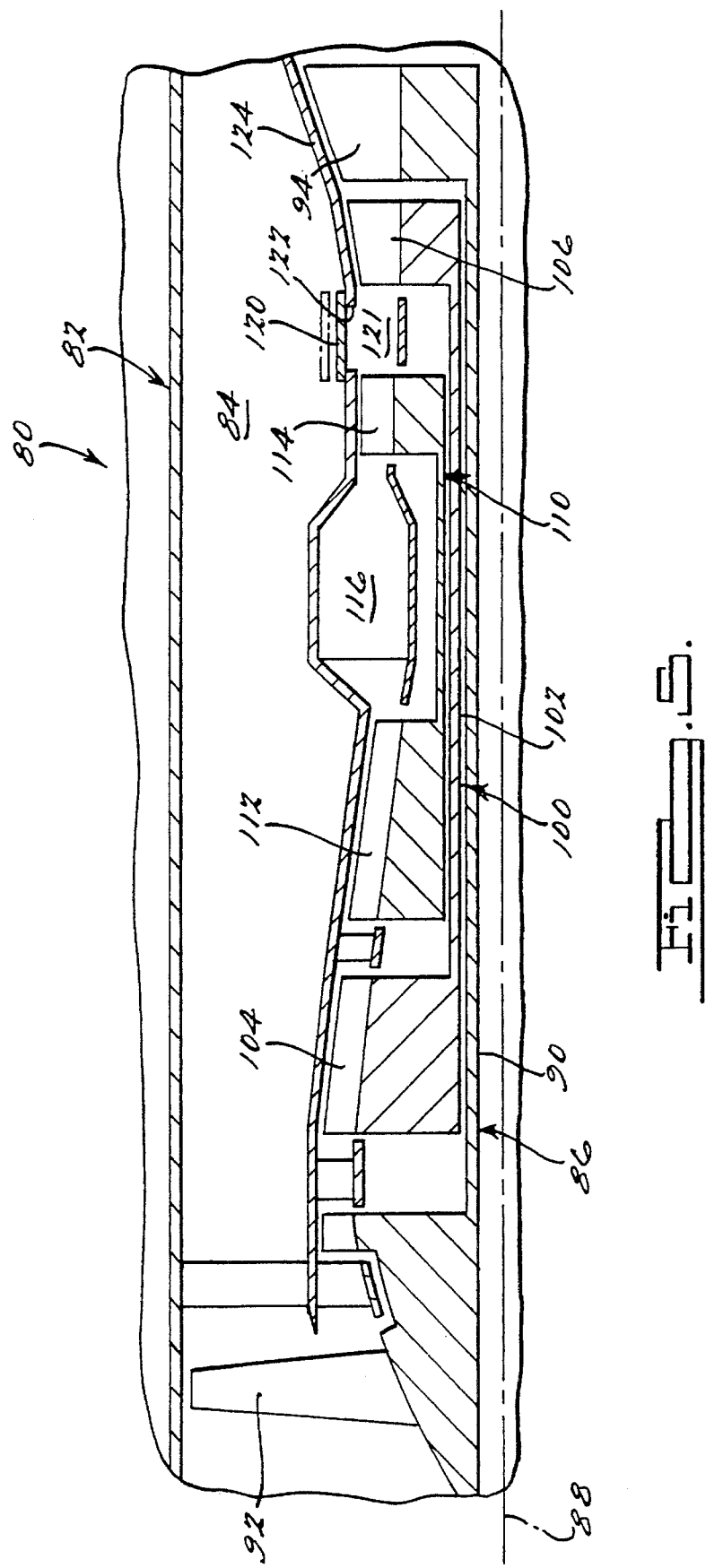
FIG. 5 is a diagrammatic representation of a three spool engine showing the orientation of the by-pass relative to the high and low pressure turbines thereof.

As seen diagrammatically in FIG. 5, a three-spool turbofan engine 80 in accordance with another embodiment of the present invention, comprises a housing 82, the outer extremity of which defines an annular by-pass duct 84. A low pressure spool assembly 86 is rotatable about a central longitudinal axis 88 of the engine 80 and comprises a shaft 90 having a fan 92 at the forward end thereof and a low pressure turbine 94 at the aft end.

An intermediate pressure spool 100 is telescoped over the low pressure spool shaft 90 for rotation in coaxial relation thereto and to the longitudinal axis 88 of the engine 80. The intermediate pressure spool 100 comprises a shaft 102 having an intermediate pressure compressor 104 at the forward end thereof and an intermediate pressure turbine 106 at the aft end thereof.

A high pressure spool 110 is telescoped over the intermediate pressure spool 100 and comprises a high pressure compressor 112 and a high pressure turbine 114. A combustor 116 is disposed between the high pressure compressor 112 and high pressure turbine 114. An accessory drive shaft (not shown) is geared to the high pressure spool 110 in the manner of the engine 6.

Operation of the engine 80 is similar to operation of the engine 6 in that a valve 120 opens an orifice 122 in the outer wall 124 of the turbine interstage duct 121 immediately aft of the high pressure turbine 114 when the engine 80 is in the idle condition thereby to maximize RPM of the high pressure spool 110 while minimizing thrust produced by the fan 92 and reducing the pressure and density at the inlet of high pressure compressor 112.

From the foregoing it should be apparent that applicants' contribution to the multi-spool turbofan engine art is an engine having a high pressure spool that operates at high idle RPM so as to power accessories and minimize acceleration time from idle to full rated RPM and thrust without producing, as a consequence heretofore exhibited in known fan jet engines, high idle thrust which compromises the landing maneuver and ground operation.

I claim:

1. A multi-spool by-pass turbofan engine comprising a low pressure spool having a fan at a forward end and a low pressure turbine at an aft end thereof;

a high pressure spool coaxially related to said low pressure spool and disposed between the fan and the low pressure turbine thereon, said high pressure spool having a high pressure compressor at a forward end disposed rearwardly of the fan on said low pressure spool and a high pressure turbine at the aft end thereof;

a combustor in fluid flow communication between the high pressure compressor and the high pressure turbine on said high pressure spool;

a combustion gas duct disposed between the high and low pressure turbines on said high and low pressure spools, respectively;

a by-pass duct extending from a point aft of the fan on said low pressure spool to a point aft of the low pressure turbine on said low pressure spool, said by-pass duct dividing air flow aft of the fan between the by-pass duct and the high pressure compressor on said high pressure spool;

an alternator driven by said high pressure spool;

an orifice in said combustion gas duct radially aligned with the aft end of the high pressure turbine on said high pressure spool; and a valve in said combustion gas duct spaced rearwardly from the orifice therein and openable at engine idle conditions to provide a fluid flow path from said high pressure turbine through said orifice thence through said valve to said by-pass duct so as to increase the expansion ratio across the high pressure turbine to maximize the RPM of said high pressure spool at idle conditions while concomitantly reducing the expansion ratio across the low pressure turbine to reduce the speed of said low pressure spool and of the fan thereon thereby reducing idle thrust produced by the fan and reducing air mass flow to the high pressure compressor on said high pressure spool without significantly reducing the RPM of said high pressure turbine.

2. A method of minimizing thrust while maximizing RPM of the high pressure spool of a multi-spool by-pass turbofan engine comprising the steps of inducing air flow through a fan at the forward end of a low pressure spool having a low pressure turbine at an aft end thereof;

dividing the air flow from the fan on said low pressure spool between a high pressure compressor on a high pressure spool and a by-pass duct;

conducting air from said high pressure compressor to a combustor disposed between the high pressure compressor and a high pressure turbine on said high pressure spool;

conducting the combustion gas to the said high pressure turbine on said high pressure spool;

conducting a portion of the combustion gas from the high pressure turbine to the low pressure turbine;

bleeding a portion of the combustion gas from immediately behind the high pressure turbine on said high pressure spool to said by-pass duct at engine idle conditions to increase the expansion ratio across the high pressure turbine to maximize the RPM thereof at idle conditions while concomitantly reducing the expansion ratio across the low pressure turbine to reduce the speed of said low pressure spool and of the fan thereon thereby reducing idle thrust produced by the fan and reducing air mass flow to the high pressure compressor on said high pressure spool; and driving an alternator by said high pressure spool.

* * * * *